Feb. 28, 1939.  A. J. ASHDOWN  2,148,794
LIGHT PROJECTOR FOR STROBOSCOPIC AND OTHER PURPOSES
Filed July 13, 1936  3 Sheets-Sheet 1

INVENTOR
ALBERT J ASHDOWN
PER Rayner & Co
ATTORNEYS

Feb. 28, 1939. A. J. ASHDOWN 2,148,794
LIGHT PROJECTOR FOR STROBOSCOPIC AND OTHER PURPOSES
Filed July 13, 1936 3 Sheets-Sheet 2

INVENTOR
ALBERT J ASHDOWN
PER
ATTORNEYS

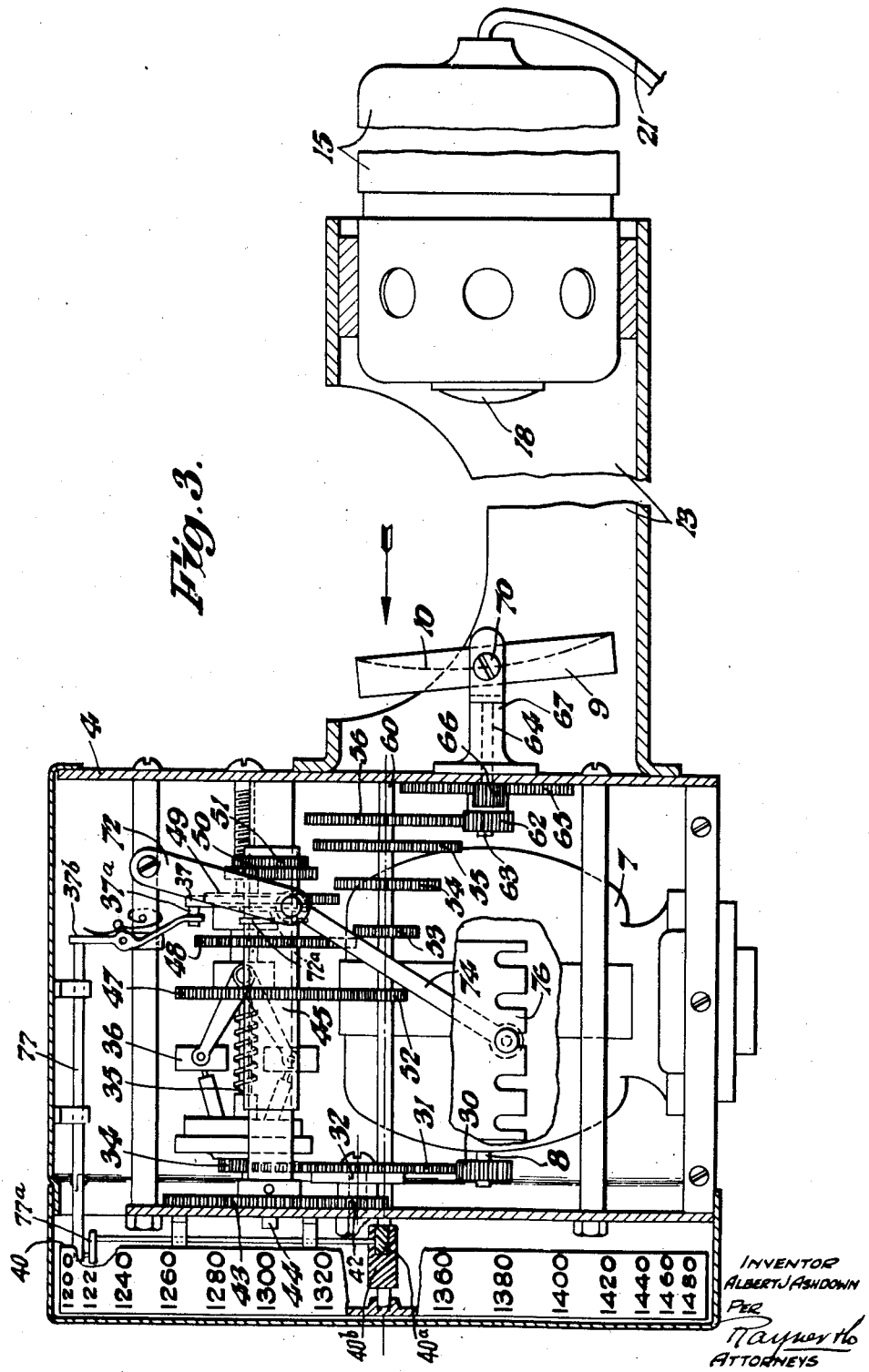

Patented Feb. 28, 1939

2,148,794

UNITED STATES PATENT OFFICE 2,148,794

LIGHT PROJECTOR FOR STROBOSCOPIC AND OTHER PURPOSES

Albert Jasper Ashdown, East Molesey, England

Application July 13, 1936, Serial No. 90,407
In Great Britain July 17, 1935

1 Claim. (Cl. 88—14)

This invention comprises improvements in and relating to light projectors for stroboscopic and other purposes. The chief object of this invention is to provide a light projector for stroboscopic purposes in which an intermittent beam of concentrated light is projected directly by a light converging reflector from a casing enclosing the light source and reflector, and in such direction relative to the casing as to ensure a great convenience of handling or setting of the casing and easy access to various parts of machinery to be inspected, and also a very intense beam of concentrated light rays on the desired object. Another object of the invention is to provide a simple, compact and readily portable apparatus which can be held conveniently in one hand and operated by the hand holding it for projecting a strong beam of light intermittently or periodically upon an object and also to provide means whereby the beam of light may be concentrated so as to give an intense illumination over a clearly defined area for a comparatively short space of time and at regularly spaced intervals. The apparatus can be used to enable moving objects to be viewed for short periods at regularly spaced intervals which may be accurately timed to any desired periodicity. The apparatus may be so timed that the beam of light is projected upon the object for a comparatively short period whilst the intervening space of time during which the beam of light does not illuminate the object is of relatively much longer duration.

The light projector may be employed for direct vision stroboscopic purposes in which the object is viewed directly by the observer without the use of any other apparatus than the light projector which causes the object to be illuminated for relatively short periods spaced at definite time intervals apart. The apparatus may also be employed in connection with speed testing and checking and enables the speed of moving objects such as shafts, pulleys and the like to be observed, ascertained or checked without the necessity for the observer or anyone else approaching close to or actually touching the shaft or other moving object.

It is preferred to construct my light projector in the form of a simple portable unit adapted to be carried in the hand so that the beam of light may be directed so that it will fall intermittently upon an object to be observed, or where prolonged observation is required it may be mounted upon a stand in such an adjustable manner as to enable the beam of light to be projected in the required direction.

In order that the invention may be clearly understood and readily carried into effect the same will now be more fully described with reference to the accompanying drawings wherein:

Fig. 3 is a view similar to Fig. 1 but showing a modified form of the light projector.

Figure 1:
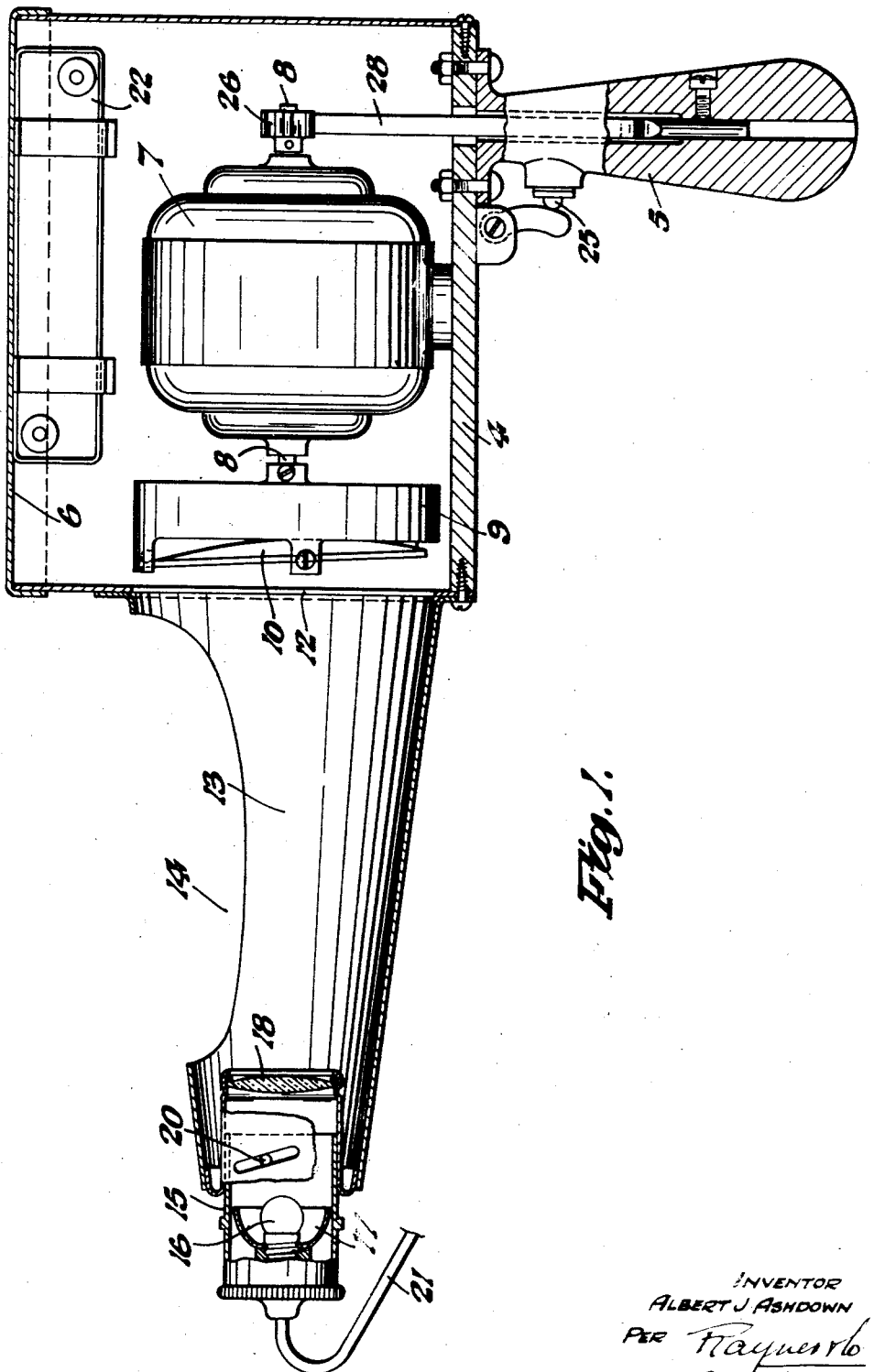
Fig. 1 is a view partly in section and partly in side elevation of a stroboscopic light projector made in accordance with the present invention.

Referring first to Fig. 1, a casing 4 has a pistol grip handle 5 whereby it can be conveniently held in one hand and pointed at the desired zone, and a lid 6 which can be opened or removed. Mounted within the casing is an electric motor 7 having a rapidly rotatable spindle 8 carrying a holder 9 for the reflecting device 10 which is a concave mirror. The mirror is adjustable and is arranged at a suitable angle to the axis of the spindle 8. The mirror faces an opening 12 in the casing and adjacent to this opening is a tubular member or casing 13 attached to the main casing 4 at one end and extending outwardly from the main casing. The tubular casing 13 has a longitudinal slot opening 14 between its ends and in its outer end is removably fitted a small holder or casing 15 which carries the light source 16 comprising an electric light bulb, and a reflector 17. By providing an opening such as 14 and locating a lens mirror 10 close to the inner end of such slot like opening, the light beam from the source 16 is collected by the rotating lens reflector and reflected back in a cone of light the axis of which is always at only a small angle to the axis of the light beams from the light source. By this means the pistol grip handle and casing as shown affords a very convenient device for directing the reflected light on to the desired zone.

It is preferred to employ a small electric light bulb adjustably mounted in the end of the tubular casing for focusing purposes. The electric lamp bulb may be of comparatively small dimensions and should be such as to produce a clearly defined area of light. The reflector 17 is of parabolic or other form adapted to collect and concentrate the light beam upon the mirror. A lens 18 is fitted in the small casing and the latter can be adjusted towards or away from the concave mirror by pin and slot 20. Electric current is supplied to the electric bulb through a flex 21 which may be connected to the mains or a dry cell battery 22 mounted on the lid of the main casing. The current for the electric motor may also be taken from the mains or from this dry cell battery.

Suitable connections may be provided on the casing for connecting the electric lamp and the electric motor to the source of current and a suitable switch 25 or switches may be incorporated for controlling the supply of current to the lamp or the electric motor or both. The beam of light from the bulb 16 and reflector 17 will be directed on to the mirror 10 at such a spot thereon that the reflected beam from the mirror will generate a frustoconical figure and will periodically project through the opening 14. This results from the movement of the mirror which is similar to that of a swash-plate.

The apparatus may be held so as to direct the moving beam of light so that it will fall intermittently upon the object to be viewed. In workshops or other closed premises where a highly concentrated light does not fall upon the object to be viewed, the device may be used in ordinary daylight since the concentrated beam of light projected intermittently on to the object may be of a far greater intensity than the surrounding illumination so that the periods of illumination by the projector will stand out definitely and give intermittent glimpses of the object of short duration spaced at relatively long intervals apart and thus enabling a stroboscopic view of the object to be obtained. The invention may also be used for speed testing of shafts or other moving objects by observing the spokes of pulleys or other definitely spaced objects arranged upon the shaft or a moving member on it.

The concave mirror is of a suitable focal length and the source of light is arranged at such a distance from it that a clearly defined beam of light will be projected on to or toward the object to be viewed and the concave mirror should be so arranged in relation to the light source that the light falling upon the object shall be concentrated within a clearly defined area and so far as possible without any penumbra or surrounding zone of lesser illumination.

For maintaining the speed of the motor constant a toothed wheel 26 is fixed to the rear end of the motor spindle 8 and cooperating with this toothed wheel is a detent 27 carried by a vibratory member comprising a tuning fork 28 as described in the specification of my British Patent No. 363,352. Other suitable control means may however be provided.

Figure 2:
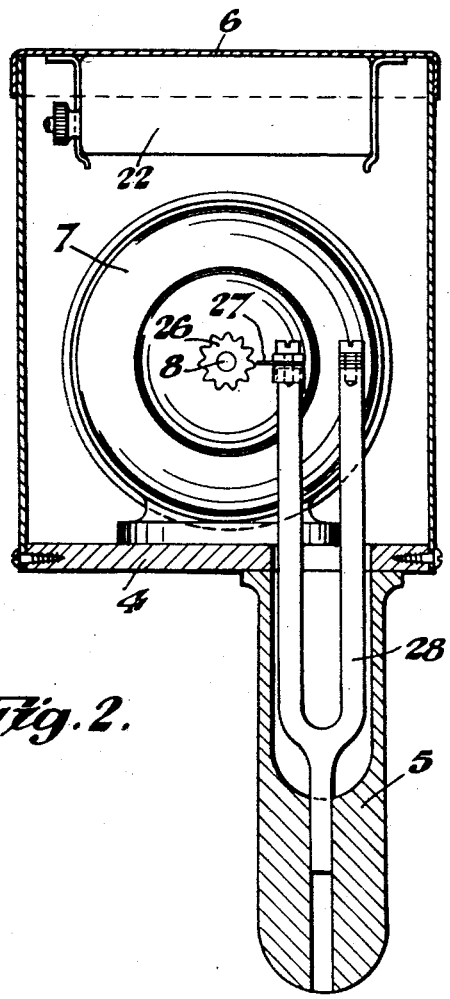
Fig. 2 is an end view partly in section of the same projector.

The arrangement shown in Fig. 3 resembles that shown in Figs. 1 and 2 in many respects and similar reference numerals are applied where appropriate.

The small casing 15 is readily removable from the tubular casing 13 for cleaning or adjustment and is provided with an optical condensing system. Instead of a plain glass 18 a lens 18a can be employed to effect the desired projection of light on to the mirror 10.

The main casing 4 contains a change speed gear and governor controlled brake made on the lines indicated in my prior British Patent No. 201,656. The motor spindle 8 is geared by gear wheels 30, 31, with a stub shaft 32. The wheel 31 also gears with a pinion 34 on the governor shaft 35 that carries the governor 36 having a brake disc 37. The usual brake block 37 engaging this disc can be moved towards or away from the disc by rotating a speed indicator wheel 40 which has numerals indicative of speed on its periphery. The wheel 40 can carry a worm 40b meshing with a worm wheel 40a the spindle of which has a crank connection 77a to a link 77 connected to a brake lever 37b carrying the brake pad 37a. The stub shaft 32 is connected by gear wheels 42, 43, with a layshaft 44 that carries a slidable splined sleeve 45. The sleeve 45 carries pinions 47, 48, 49, 50, 51, adapted to be brought into gear with pinions 52, 53, 54, 55, 56, respectively, by slidable movement of the sleeve 45, for effecting change of speed of rotation of the concave mirror 10. The pinions 52—56 are fixed to a spindle 60 which is connected by pinions 56, 62, with a stub shaft 63 which in turn drives a spindle 64 through pinions 65, 66. The spindle 64 is mounted in a bearing 67 attached to the casing 4 and the mirror 10 is mounted on the spindle 64 its angle being adjustable by the screw device 70. The sliding of the sleeve 45 can be accomplished by a striking gear comprising a lever 72 which is pivotally mounted at its upper end on a fixed part and engages at its lower end between collars 72a on the sleeve. The lower end has a link 74 attached to it the lower end of which link can be moved by the operator and fixed in any of the appropriate notches in a gate 76. With the gear wheels 49, 54, in engagement the speed of the mirror may be adjustable by the brake device from 1000–2000 revolutions per minute, the ratio of these wheels being for example 1:1. The other gear wheels may give one quarter, one half, twice and four times, respectively, this range of speeds.

I claim:

Projector for stroboscopic purposes, comprising a portable housing, a pistol grip handle depending from said housing, an electric motor in the housing, a trigger switch adjacent to said handle for bringing the motor into and out of circuit, an opening in one end of the housing, a tubular casing extending beyond said opening, a reflector and lamp at the free end of the tubular casing having an optical axis substantially coincident with the axis of the tubular casing, a rotary member driven by said motor and located close to and opposite said opening, a longitudinal slot in said casing, and a converging reflector on said rotary member inclined in relation to said axis so as to collect and reflect light from said lamp, said reflector having an axis of reflection of the light from said lamp which is at such an angle to said optical axis so as to direct a beam of light along said casing so that it passes through said slot intermittently at a small angle to the axis of said casing.

ALBERT JASPER ASHDOWN.